United States Patent [19]
Mistry

[11] Patent Number: 5,355,839
[45] Date of Patent: Oct. 18, 1994

[54] ANIMAL IDENTIFICATION DEVICE UTILIZING A MICROCASSETTE

[76] Inventor: Rupal T. Mistry, 9000 Cheltenham Dr., Brandywine, Md. 20613

[21] Appl. No.: 124,206

[22] Filed: Sep. 21, 1993

[51] Int. Cl.$^5$ ............................................. A01K 39/00
[52] U.S. Cl. ...................................................... 119/858
[58] Field of Search ............... 49/856, 858, 792, 793, 49/794, 795; 222/250, 148, 253

[56] References Cited

U.S. PATENT DOCUMENTS

| | | | |
|---|---|---|---|
| 887,072 | 5/1908 | Delaney | 119/794 |
| 2,317,176 | 4/1943 | Byrd | 224/226 X |
| 2,929,358 | 3/1960 | Morrow | 119/109 |
| 3,477,410 | 11/1969 | Lettieri | 119/109 |
| 3,585,743 | 6/1971 | Jeffers | 40/21 |
| 4,091,766 | 5/1978 | Colliard | 119/858 X |
| 4,137,660 | 2/1979 | Dettmann et al. | 40/303 |
| 4,178,879 | 12/1979 | Cunningham | 119/106 |
| 4,218,991 | 8/1980 | Cole | 119/858 X |
| 4,584,967 | 4/1986 | Taplin | 119/793 |
| 5,060,835 | 10/1991 | Payne | 224/224 |

Primary Examiner—Gene Mancene
Assistant Examiner—Thomas Price
Attorney, Agent, or Firm—C. C. Shroff

[57] ABSTRACT

A microcassette is attached to a conventional animal collar with information concerning the owner of the animal, the owner's location and other pertinent identification concerning the animal. If the animal becomes lost, the finder has merely to play the microcassette to determine the animal's owner. The microcassette is enclosed in a weatherproof holder which is strongly attached to the collar to prevent accidental removal. The microcassette's information may be changed if the owner relocates by simply recording a new identification message.

19 Claims, 4 Drawing Sheets

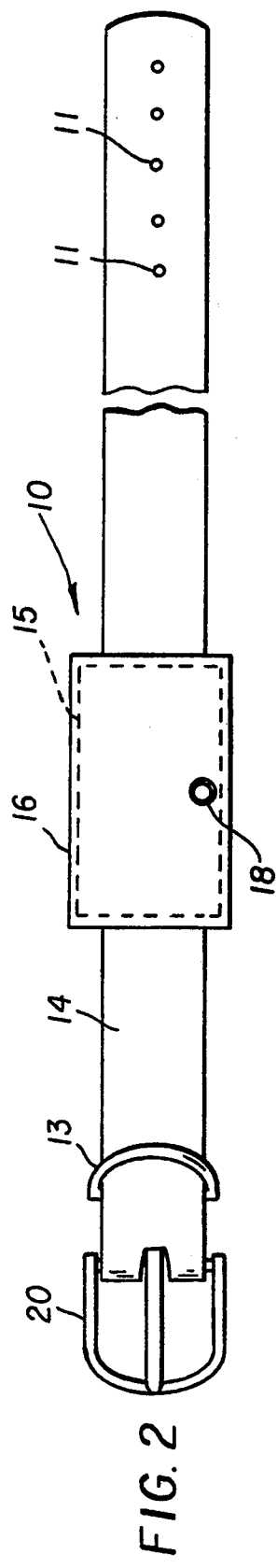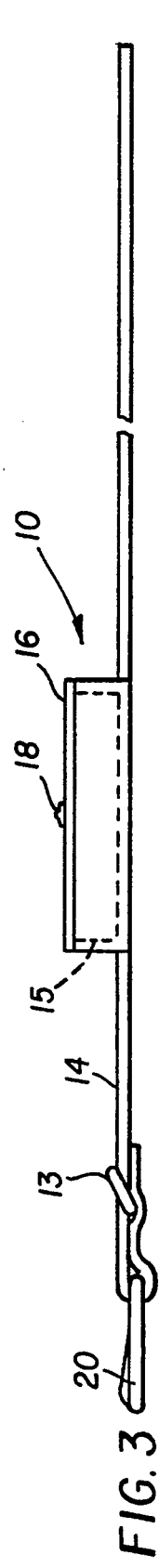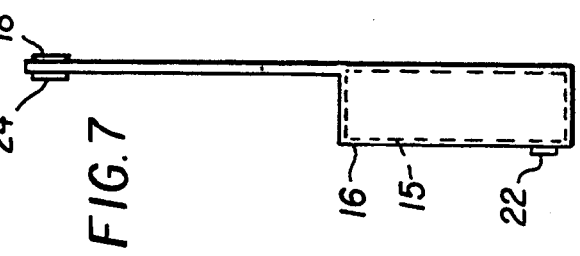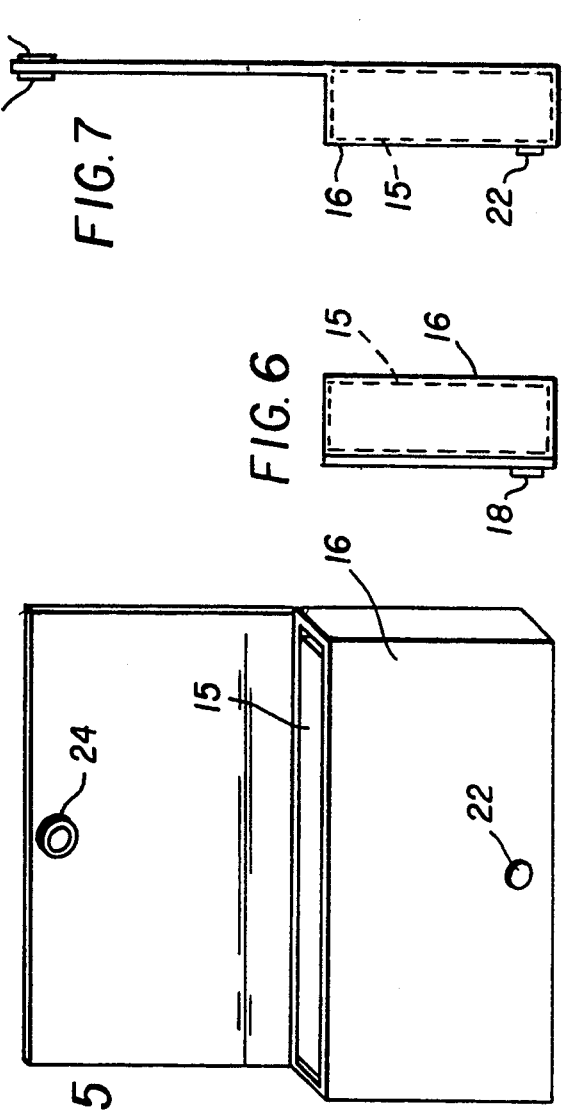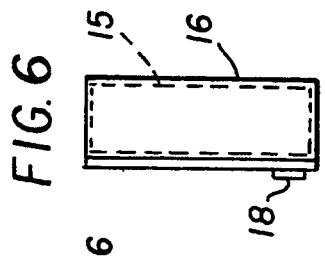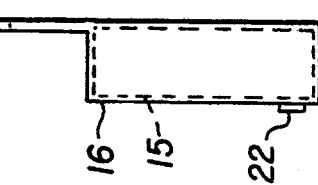

ANIMAL IDENTIFICATION DEVICE UTILIZING A MICROCASSETTE

BACKGROUND OF THE INVENTION

1. Field of the Invention

The present invention relates generally to identification devices for animals, and more particularly, to a microcassette tape attached to an animal collar which contains all pertinent identification information of the animal and the animal's owner recorded on the tape. By playing the tape one may facilitate the return of a lost animal to the owner.

2. Description of the Prior Art

Identification devices for animals which are mounted on a collar are known in ad. U.S. Pat. No. 4,178,879 discloses a restraining device for animals which includes an animal collar with a flexible belt and a transparent window running along a substantial portion of the belt. A strip containing identifying indicia is placed inside the transparent window. The indicia contains ownership identification to facilitate the return of the lost animal.

U.S. Pat. No. 4,137,660 discloses an identification holder for dogs and cats which includes an identification tag fastened to a collar harness or leash. The holder comprises a transparent plastic pocket in which identifying indicia is placed. The indicia is placed on a strip which is held on the collar by a snap fastener. The indicia may be changed to reflect changes in the owner's address.

U.S. Pat. No. 3,585,743 discloses a license tag and identification holder for a dog collar. This device includes a holder for a license tag or other identifying data such as the owner's name and address which is easily installed on existing dog collar without the need for modifying the collar in any way.

Thus, while the foregoing body of prior ad indicates it to be well known to use identifying indicia on an animal collar to assist in the identification of the animal and the subsequent return of the animal to the owner, the provision of a more simple and cost effective device to give more complete identifying information concerning a lost animal is not contemplated. Nor does the prior an described above teach or suggest a microcassette tape connected to a animal collar which may be utilized as an identification device for the animal. Through the use of a microcassette tape more complete information may be given concerning the animal which is an advantage of the present invention over the prior art. Other advantages of the present invention over the prior art also will be rendered evident.

SUMMARY OF THE INVENTION

To achieve the foregoing and other advantages, the present invention, briefly described, provides for a microcassette which is attached to a conventional animal collar with information concerning the owner of the animal, the owner's location and other pertinent identification concerning the animal. If the animal becomes lost, the finder has merely to play the microcassette to determine the animal's owner. The microcassette is enclosed in a weatherproof holder which is strongly attached to the collar to prevent accidental removal. The microcassette's information may be changed if the owner relocates by simply recording a new identification message.

The above brief description sets forth rather broadly the more important features of the present invention in order that the detailed description thereof that follows may be better understood, and in order that the present contributions to the art may be better appreciated. There arc, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein arc for the purpose of description and should not be regarded as limiting.

As such, those skilled in the an will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved animal identification device utilizing a microcassette tape which has all of the advantages of the prior art and none of the disadvantages.

It is another object of the present invention to provide a new an improved animal identification device utilizing a microcassette tape which may be easily and efficiently manufactured and marketed.

It is a further objective of the present invention to provide a new and improved animal identification device utilizing a microcassette tape which is of durable and reliable construction.

An even further object of the present invention is to provide a new and improved animal identification device utilizing a microcassette tape which is susceptible of a low cost of manufacture with regard to both materials and labor, and which accordingly is then susceptible of low prices of sale to the consuming public, thereby making such an animal identification device utilizing a microcassette tape available to the buying public.

Still yet a further object of the present invention is to provide a new and improved animal identification device utilizing a microcassette tape which would permit a greater amount of information concerning the animal to be incorporated into the identification device, including, but not limited to, the animal's name, owner's name and address, owner's phone number, the animal's medical history, and any other pertinent data.

It is still a further object of the present invention is to provide a new and improved animal identification device utilizing a microcassette tape which may be updated or changed to reflect changes in the animal's name, owner's name and address, owner's phone number, the animal's medical history, or any other pertinent data.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 2 is a top plan view of the animal identification device utilizing a microcassette.

FIG. 3 is a side view of the animal identification device utilizing a microcassette.

FIG. 4 is a front view of the microcassette receiving pocket of the instant invention in the closed position.

FIG. 5 is a front view of the microcassette receiving pocket of the instant invention in the open position.

FIG. 6 is a side view of the microcassette receiving pocket of the instant invention in the closed position.

FIG. 7 is a side view of the microcassette receiving pocket of the instant invention in the open position.

DESCRIPTION OF THE PREFERRED EMBODIMENT

With reference now to the drawings, a new and improved animal identification device utilizing a microcassette embodying the principles and concepts of the present invention will be described.

Figure 1:
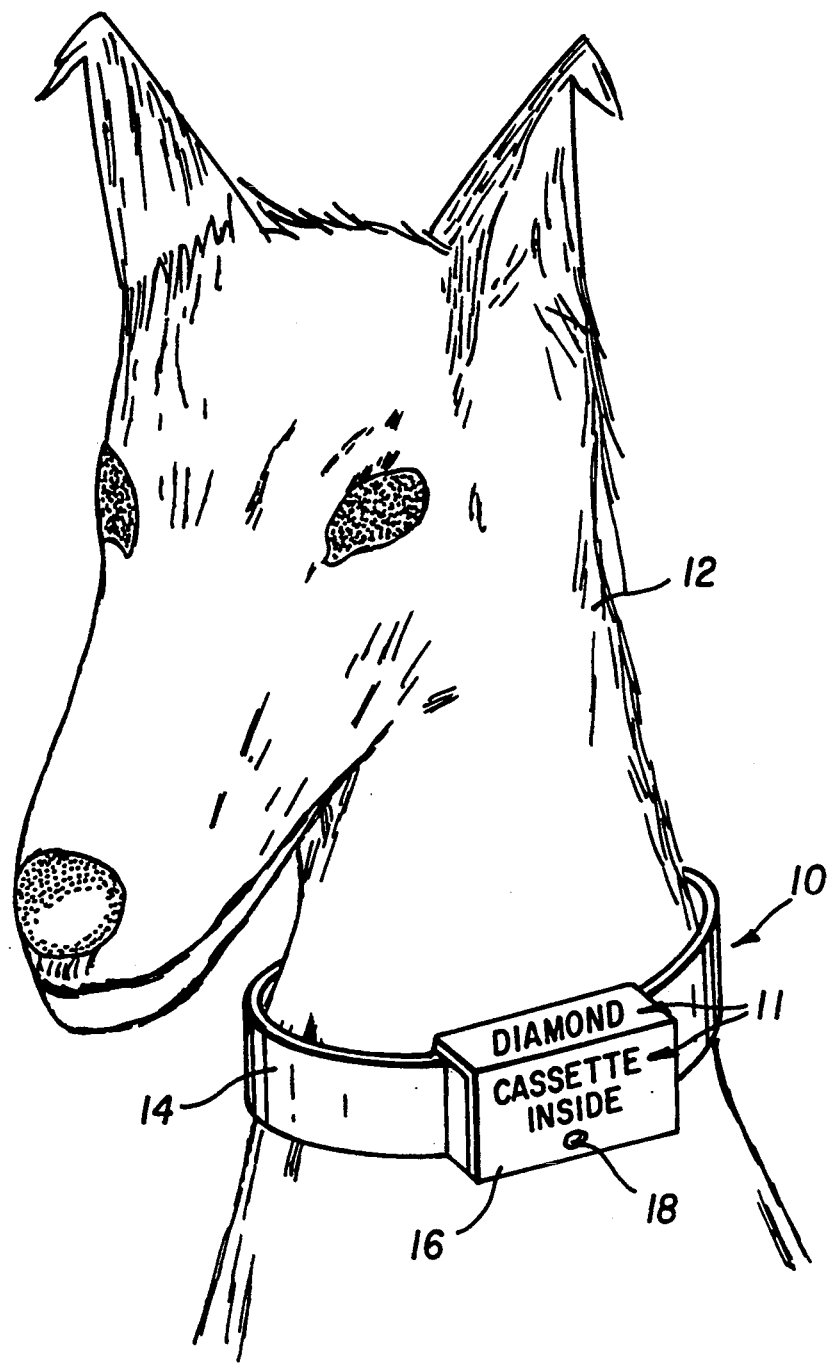
FIG. 1 is an environmental perspective view showing the preferred embodiment of the animal identification device utilizing a microcassette of the invention.

Turning initially to FIG. 1 there is shown a first exemplary embodiment of the animal identification device utilizing a microcassette of the instant invention generally designated by reference numeral 10. In its preferred form, animal identification device 10 comprises a collar 14 secured about the neck of an animal 12 by any conventional means. A microcassette holder 16 is secured to the collar 14 in such a fashion as to preclude the holder 16 from becoming detached from the collar 14. A microcassette 15 is secured within the microcassette holder 14 by a snap closure device 18. Although a snap closure 18 is shown in the figures any type of closure means may be utilized, including, but not limited to, hook and loop fasteners, zipper or buttons. The microcassette holder 16 has an indicia receiving surface 11 thereon, where identifying indicia may be provided. The microcassette holder 14 is of rugged construction, weatherproof, and forms a protective enclosure for the microcassette 15. It is anticipated that animal identification information, such as the animal's owners address, phone number and name will be recorded onto the microcassette 15. This along with the animal's name and medical information provides a complete set of animal statistics and data.

Referring now specifically to FIGS. 2 and 3 the animal identification device 10 is shown. A collar 14 with conventional securing means comprising a buckle 20 and holes 11 is disclosed. A collar strap securing ring 13 is located next to the buckle 20. The microcassette holder 16 is attached to the collar 14. The attachment of the microcassette holder 16 to the collar 14 may be accomplished in many ways, including, but not limited to, hook and loop fasteners, stitching or apertures made the microcassette holder 16 through which the collar 14 may pass. Alternatively, the microcassette holder 16 could be made integral with the collar 14. A microcassette 15 is shown residing within the microcassette holder 16. Snap closure means 18 secures the microcassette 15 firmly within the microcassette holder 16.

FIGS. 4–5 shows a front view of the microcassette holder 16 in both open and closed positions respectively.

FIG. 4 shows microcassette holder 16 in the closed position being secured with snap closure means 18. FIG. 5 shows the microcassette holder 16 in the open position revealing the microcassette 15 inside. The male snap 24 and the female snap 22 are shown in the unconnected or unfastened relation.

FIGS. 6–7 shows a side view of the microcassette holder 16 in both open and closed positions respectively. FIG. 6 includes microcassette holder 16 in the closed position, being secured by closure fastener 18 and including the microcassette 15. FIG. 7 shows the microcassette holder 16 in the open position, including male snap 24 and female snap 22 in the unconnected relation.

Figure 8:
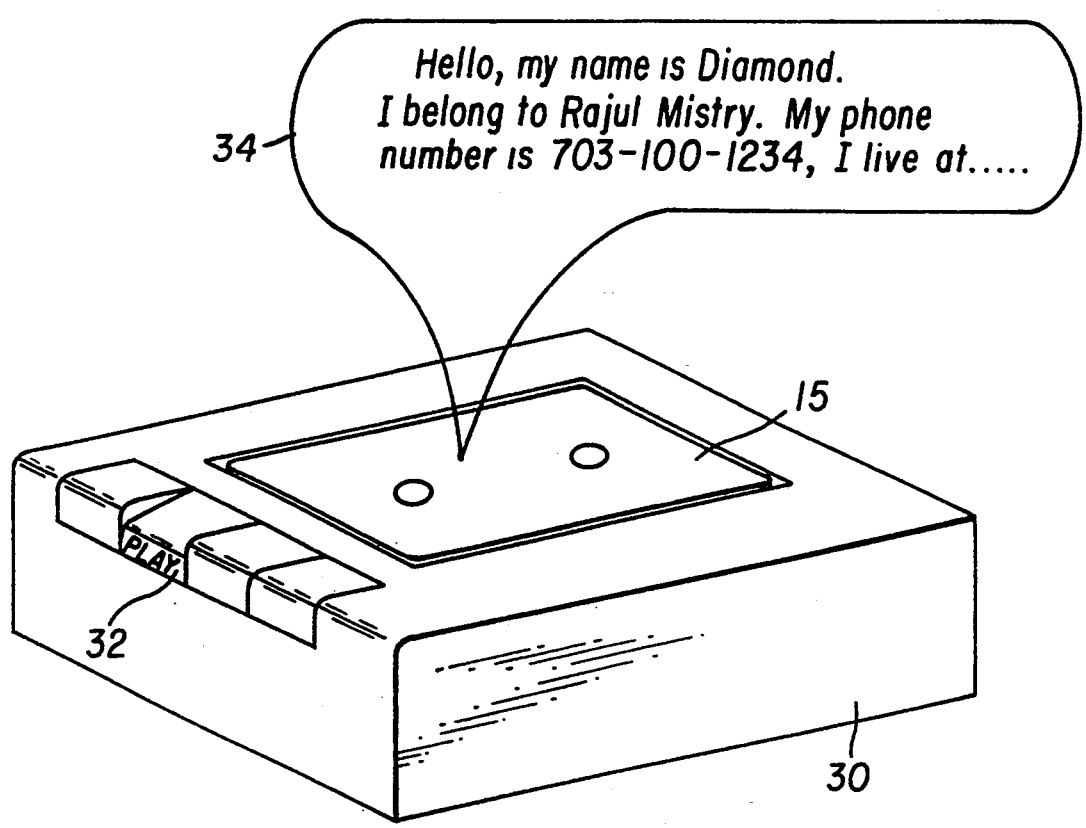
FIG. 8 is a perspective view of a microcassette tape recorder playing the previously recorded message.

Referring now specifically to FIG. 8, a microcassette recorder/player 30 is shown playing the identification message 34. The identification message may include the owner's name, telephone number, address, work telephone number, veterinarian's address and phone number, the animal's medical history and the animal's name. Identification message 34 is merely an example of a sample message and is no way limiting to the scope of identification messages possible.

Figure 9:
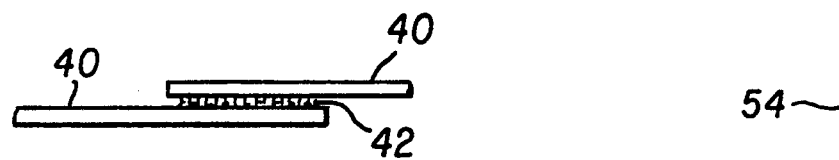
FIG. 9 is a view showing the hook and loop fastener attachment means for securing the collar to the animal.

FIG. 9 shows the two ends of an animal collar 40 being secured by hook and loop fasteners 42.

Figure 10:
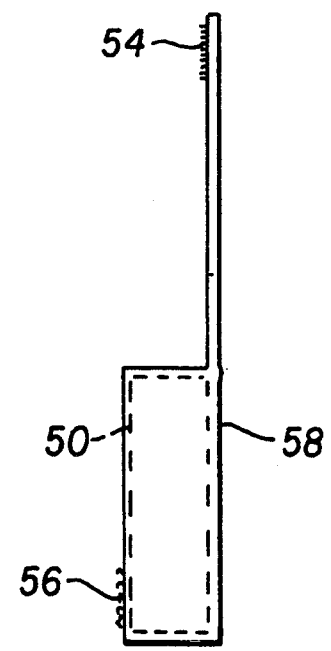
FIG. 10 is a view of the microcassette receiving pocket of the instant invention including hook and loop fastening means.

FIG. 10 shows the microcassette 50 being held in microcassette receiving pocket 58 with hook and loop securing means 54 and 56.

Figure 11:
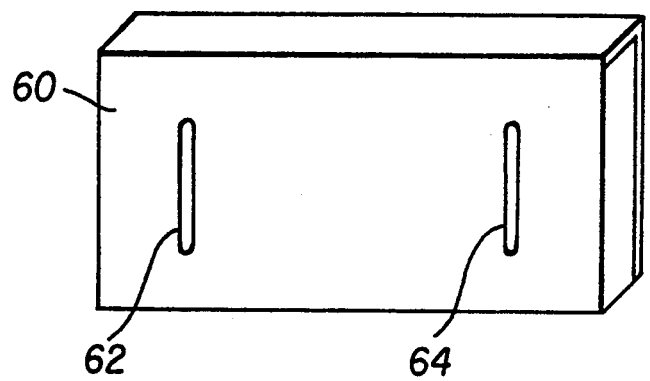
FIG. 11 is a view of the microcassette receiving pocket showing the removable attachment structure of parallel apertures through which the animal collar is passed in order to secure the pocket to the collar.
Figure 12:
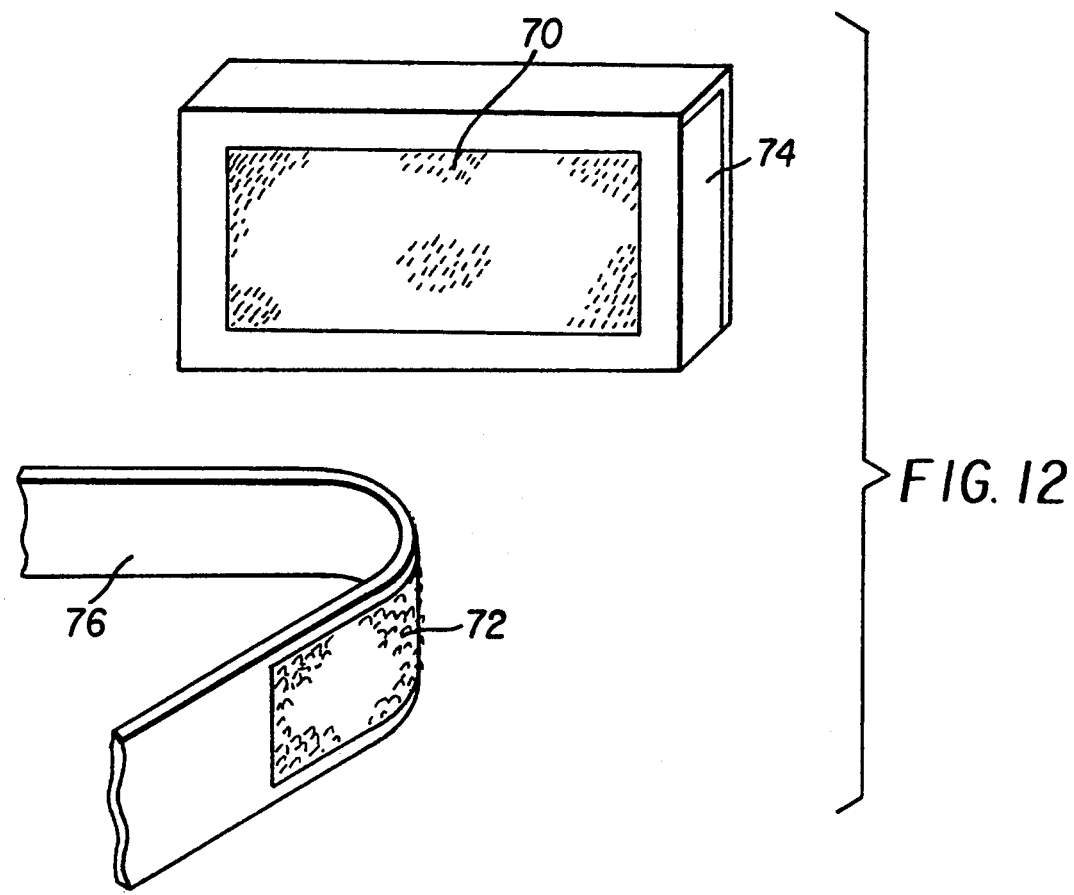
FIG. 12 is a view of the microcassette receiving pocket showing the removable attachment structure of the hook and loop fasteners.

Referring now specifically to FIGS. 11 and 12, several alternative non-permanent ways of securing the microcassette holder to the animal collar are shown. In FIG. 11, two apertures 62 and 64 are shown in the microcassette holder 60. The animal collar would be passed through the two apertures securing the holder to the collar. FIG. 12 shows the hook and loop fasteners (70 and 72) for securing the microcassette holder 74 to the animal collar 76.

It is apparent from the above that the present invention accomplishes all of the objectives set forth by providing a new and improved animal identification device utilizing a microcassette tape which would permit a greater amount of information concerning the animal to be incorporated into the identification device, including, but not limited to, the animal's name, owner's name and address, owner's phone number, the animal's medical history, and any other pertinent data.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed is:

1. In an animal pet collar, an identification and information storage device comprising:
    a flexible collar member including attachment means to secure the collar to the animal;
    a microcassette;
    receiving means for said microcassette, said receiving means being integral with said collar member;
    said receiving means further including securement means such that said microcassette is held firmly within said receiving means;
    whereby said microcassette has recorded thereon information pertaining to the animal's owner and location of the animal's home.

2. The identification and information storage device of claim 1 wherein said attachment means includes a buckle.

3. The identification and information storage device of claim 1 wherein said attachment means includes hook and loop fasteners.

4. The identification and information storage device of claim 1 wherein said receiving means includes an indicia receiving surface.

5. The identification and information storage device of claim 3 wherein said receiving means includes an indicia receiving surface.

6. The identification and information storage device of claim 5 wherein said indicia receiving surface includes indicia which identifies the animal.

7. The identification and information storage device of claim 4 wherein said indicia receiving surface includes indicia which identifies the animal.

8. In an animal pet collar, an identification and information storage device comprising:
    a flexible collar member including attachment means to secure said collar to an animal;
    a microcassette;
    receiving means for said microcassette, said receiving means being removable attached to said collar member be removable attachment means;
    said receiving means further including securement means such that said microcassette is held firmly within said receiving means;
    whereby said microcassette has recorded thereon information pertaining to the animal's owner and location of the animal's home.

9. The identification and information storage device of claim 8 wherein said attachment means includes a buckle.

10. The identification and information storage device of claim 8 wherein said attachment means includes hook and loop fasteners.

11. The identification and information storage device of claim 9 wherein said receiving means includes an indicia receiving surface.

12. The identification and information storage device of claim 10 wherein said receiving means includes an indicia receiving surface.

13. The identification and information storage device of claim 11 wherein said indicia receiving surface includes indicia which identifies the animal.

14. The identification and information storage device of claim 18 wherein said indicia receiving surface includes indicia which identifies the animal.

15. The identification and information storage device of claim 8 wherein said removable attachment means includes hook and loop fasteners.

16. The identification and information storage device of claim 8 wherein said removable attachment means includes two parallel apertures through which said collar passes.

17. The identification and information storage device of claim 1 wherein said securement means includes snap fasteners.

18. The identification and information storage device of claim 1 wherein said securement means includes hook and loop fasteners.

19. The identification and information storage device of claim 8 wherein said securement means includes snap fasteners.

* * * * *